No. 733,110.

Patented July 7, 1903.

UNITED STATES PATENT OFFICE.

ERNST ZÜHL, OF BERLIN, GERMANY.

CELLULOID OR PYROXYLIN COMPOUND AND PROCESS OF MAKING SAME.

SPECIFICATION forming part of Letters Patent No. 733,110, dated July 7, 1903.

Application filed April 17, 1902. Serial No. 103,336. (No specimens.)

*To all whom it may concern:*

Be it known that I, ERNST ZÜHL, doctor of philosophy, chemist, a subject of the German Emperor, residing at 95 Belle-Alliancestrasse, Berlin, in the Empire of Germany, have invented certain new and useful Improvements in Celluloid or Pyroxylin Compounds and Processes of Making Same, of which the following is a clear and exact specification.

My invention relates to an artificial solid substance which is employed in the arts and trades for the same purposes as celluloid, pyralin, and similar compositions.

It is the special object of my invention to produce a cheap composition of this kind, in which the use of camphor is preferably entirely or partly dispensed with. In the specification of my Letters Patent Serial No. 66,913, of 1901, the esters of the inorganic acids and especially those of phosphoric acid with monoöxygenated hydrocarbons of the aromatic series are used for this purpose. Now it has been found that besides triphenyl phosphate, tricresyl phosphate, and trinaphthyl phosphate, &c., the substitution products of these acid esters dissolve nitrocellulose and supply a useful substitute for camphor. Accordingly the oxygen of the PO group may be replaced by sulfur or the hydrogen of the benzole ring by indifferent bodies or substitutes—for instance, the halogens, nitro groups, oxymethyl groups, or the like. By compounding these with nitrocellulose substances are obtained which differ from the products obtained by the use of tricresyl phosphate and the like, partly by a reduced combustibility and partly by an increased flexibility and malleability in the final product. The esters which come more particularly into question are the thiophosphoric-acid esters of the phenols, cresols, and naphthols or the substitution products thereof and the phosphoric-acid esters of the phenols, cresols, and naphthols substituted by halogens.

In manufacturing the solid substance I substantially proceed as follows: The nitrocellulose is preferably treated with an auxiliary solvent; but this is not indispensably necessary. Then the above-mentioned substituted phosphoric-acid esters are mixed therewith and the resulting mixture manipulated according to the well-known methods employed in the manufacture of celluloid, so that the solid material is obtained. For many purposes I prefer to use the following ingredients, given by way of examples: First, forty kilograms of tricresylthio-phosphate, $PS(OC_7H_7)3$, are mixed with or without the aid of an auxiliary solvent with one hundred kilograms of nitrocellulose and the mixture is then further treated as usual in the manufacture of celluloid. Second, thirty-three kilograms of dinitrotri-naphthylthio-phosphate, $PS[OC_{10}H_5(NO_2)_2]3$, and one hundred kilograms of nitrocellulose are mixed and then treated as above described. Third, thirty-five kilograms of mono-chlortri-cresyl-phosphate, $PO(C_7H_6Cl)3$, and one hundred kilograms of nitrocellulose are mixed and then treated as above described. Fourth, thirty kilograms of tetra-nitrotri-naphthyl-phosphate, $PO[OC_{10}H_3(NO_2)_4]3$, and one hundred kilograms of nitrocellulose are mixed and then treated as described. These proportions may be varied, however, within reasonable limits.

Having thus described my invention, I claim as new and desire to secure by Letters Patent—

1. The process of manufacturing pyroxylin compounds consisting in compounding nitrated cellulose with the phosphoric-acid esters of the monoöxygenated hydrocarbons of the aromatic series in which a part of the hydrogen has been replaced by an acid radical.

2. The process of manufacturing pyroxylin compounds consisting in compounding nitrated cellulose with the phosphoric-acid esters of the cresols in which a part of the hydrogen has been replaced by an acid radical.

3. The process of manufacturing pyroxylin compounds consisting in compounding nitrated cellulose with the phosphoric-acid esters of the monoöxygenated hydrocarbons of the aromatic series in which a part of the hydrogen has been replaced by an acid radical and in which the oxygen of the PO group has been replaced by sulfur.

4. The process of manufacturing pyroxylin compounds consisting in compounding nitrated cellulose with the phosphoric-acid esters of the cresols in which a part of the hydrogen has been replaced by an acid radical and in which the oxygen of the PO group has been replaced by sulfur.

5. As a new article of manufacture a solid composition to be used as a material in the arts and trades and composed essentially of nitrated cellulose and phosphoric-acid esters of the monoöxygenated hydrocarbons of the aromatic series in which a part of the hydrogen has been replaced by an acid radical.

6. As a new article of manufacture a solid composition composed essentially of nitrated cellulose and phosphoric-acid esters of the cresols in which a part of the hydrogen has been replaced by an acid radical.

7. As a new article of manufacture a solid composition composed essentially of nitrated cellulose and phosphoric-acid esters of the monoöxygenated hydrocarbons of the aromatic series in which a part of the hydrogen has been replaced by an acid radical and in which the oxygen of the PO group has been replaced by sulfur.

Signed at Berlin this 3d day of April, 1902.

ERNST ZÜHL.

Witnesses:
　HENRY HASPER,
　WOLDEMAR HAUPT.